(12) United States Patent
Lahcanski et al.

(10) Patent No.: US 8,638,223 B2
(45) Date of Patent: Jan. 28, 2014

(54) MOBILE COMMUNICATOR WITH ORIENTATION DETECTOR

(75) Inventors: Tomi Lahcanski, Rochester, NY (US); Ronald Steven Cok, Rochester, NY (US)

(73) Assignee: Kodak Alaris Inc., Rochester, NY (US)

( * ) Notice: Subject to any disclaimer, the term of this patent is extended or adjusted under 35 U.S.C. 154(b) by 315 days.

(21) Appl. No.: 13/110,218

(22) Filed: May 18, 2011

(65) Prior Publication Data
US 2012/0293325 A1 Nov. 22, 2012

(51) Int. Cl.
G08B 1/08 (2006.01)
G08B 13/14 (2006.01)

(52) U.S. Cl.
USPC .............. 340/539.13; 340/539.11; 340/572.1

(58) Field of Classification Search
USPC .............. 340/539.1, 539.11, 539.13, 539.25, 340/539.28, 539.29, 505, 517, 572.1, 572.4, 340/601; 455/456.3, 456.6; 705/14.4, 705/14.51, 26.1, 26.3
See application file for complete search history.

(56) References Cited

U.S. PATENT DOCUMENTS

| | | | |
|---|---|---|---|
| 5,973,643 A * | 10/1999 | Hawkes et al. | 342/457 |
| 6,829,095 B2 | 12/2004 | Amitai | |
| 7,084,775 B1 * | 8/2006 | Smith | 340/601 |
| 7,200,566 B1 | 4/2007 | Moore et al. | |
| 7,378,963 B1 * | 5/2008 | Begault et al. | 340/539.29 |
| 7,610,233 B1 | 10/2009 | Leong et al. | |
| 7,711,598 B2 | 5/2010 | Perkowski | |
| 7,865,414 B2 | 1/2011 | Fung et al. | |
| 7,870,022 B2 | 1/2011 | Bous et al. | |
| 8,420,977 B2 * | 4/2013 | Bradley et al. | 219/121.67 |
| 2005/0077085 A1 * | 4/2005 | Zeller et al. | 175/45 |
| 2007/0237491 A1 | 10/2007 | Kraft | |
| 2007/0273583 A1 * | 11/2007 | Rosenberg | 342/367 |
| 2009/0298419 A1 * | 12/2009 | Ahya et al. | 455/3.06 |
| 2011/0143779 A1 * | 6/2011 | Rowe et al. | 455/456.3 |

OTHER PUBLICATIONS http://recherche.univ-montp3.fr/netcom_labs/volumes/articlesV201/Netcom9-25.pdf Networks & Communication Studies, Netcom, vol. 20, No. 1-2, 2006, p. 9-25, Geolocation Technology and Local Information in Mobile Telephony, Yoshio Arai.

* cited by examiner

Primary Examiner — Van T. Trieu
(74) Attorney, Agent, or Firm — Hogan Lovells US LLP

(57) ABSTRACT

A mobile communication device adapted to communicate with a plurality of pre-determined sources disposed at pre-determined different locations includes an identification code, a receiver adapted to receive wirelessly communicated information from a particular source at a pre-determined location, an orientation detector that detects the orientation of the receiver relative to the pre-determined location of the particular source to provide an orientation signal indicating that the mobile communication device is oriented toward the predetermined location of the particular source, and an interface circuit responsive to the wirelessly communicated information and the orientation signal to register the identification code with the particular source.

34 Claims, 11 Drawing Sheets

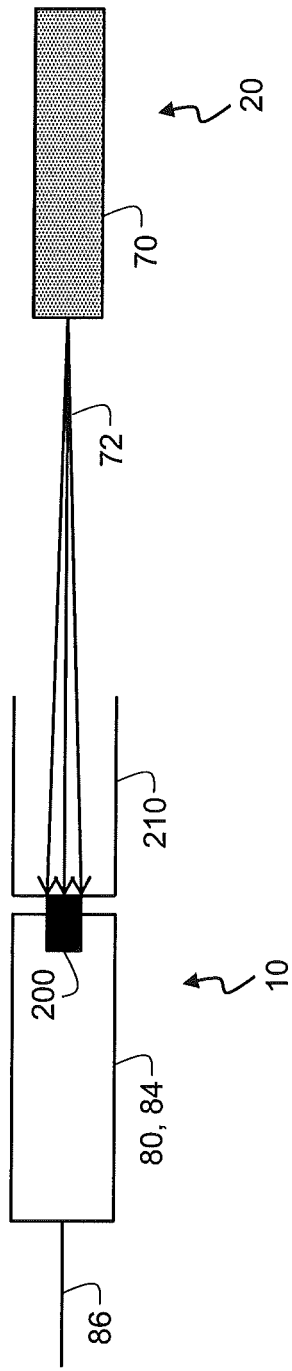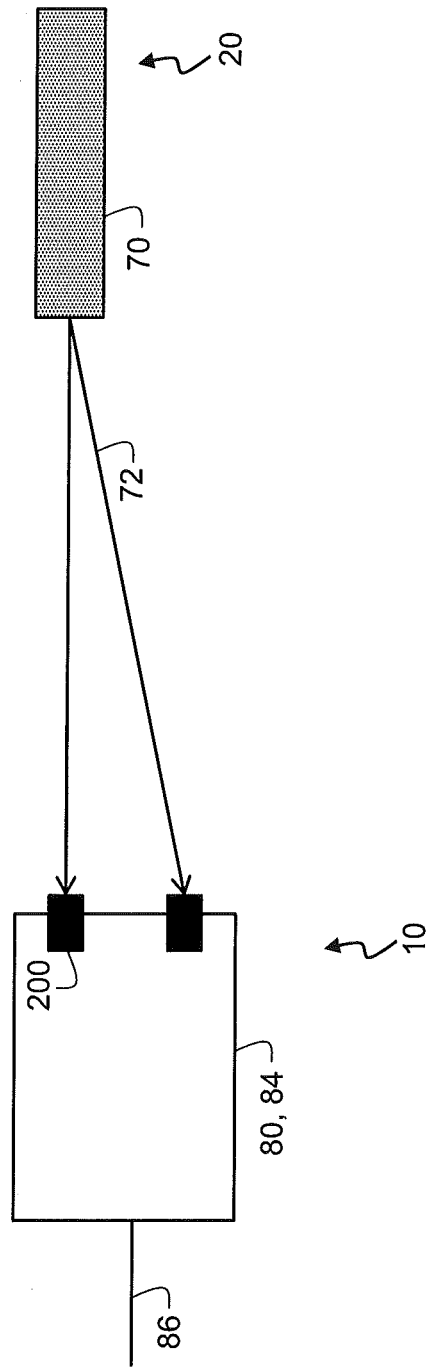

MOBILE COMMUNICATOR WITH ORIENTATION DETECTOR

CROSS REFERENCE TO RELATED APPLICATIONS

Reference is made to commonly-assigned, co-pending U.S. patent application Ser. No. 13/110,225 filed May 18, 2011, entitled "Augmented-Reality Mobile Communicator with Orientation Detector" by Tomi Lahcanski, et al., the disclosure of which is incorporated herein.

Reference is made to commonly-assigned, co-pending U.S. patent application Ser. No. 13/110,232 filed May 18, 2011, entitled "Method for Compiling Information from Mobile Communicators" by Tomi Lahcanski, the disclosure of which is incorporated herein.

Reference is made to commonly-assigned, co-pending U.S. patent application Ser. No. 13/110,244 filed May 18, 2011, entitled "Information Source for Mobile Communicators" by Tomi Lahcanski, the disclosure of which is incorporated herein.

FIELD OF THE INVENTION

The present invention relates to a mobile communication device having an orientation detector in communication with visible information sources.

BACKGROUND OF THE INVENTION

Head-mounted displays are widely used in gaming and training applications. Such head-mounted displays typically use electronically controlled displays mounted on a pair of glasses or a helmet with supporting structures such as ear, neck, or head pieces that are worn on users' heads. Displays are built into the glasses together with suitable optics to present electronic imagery to the users' eyes. In one prior-art head-mounted display, a transparent or partially transparent display area permits a user to view the real world through the transparent display area while projectors affixed to the display area project information visible to the user onto the display area. In another design, information visible to the user is projected onto an opaque display area to provide an immersive display system independent of scenes in the real world.

U.S. Pat. No. 6,829,095 describes a device with the head-mounted display or augmented reality display in a glasses format where image information is presented within the lens areas of the glasses. The lens areas of the glasses in this patent include waveguides to carry the image information to be displayed from an image source, with a built-in array of partially reflective surfaces to reflect the information out of the waveguide in the direction of the user's eyes. U.S. Patent Application Publication No. 20070237491 presents a head-mounted display that can be changed between an opaque mode where image information is presented and a see-through mode where the image information is not presented and the display is transparent. This mode change is accomplished by a manual switch that is operated by the user's hand or a face muscle motion. This head-mounted display is either opaque or fully transparent.

Some information display devices provide a gaze-tracking capability that can detect the direction of a user's gaze relative to the head-mounted device or display. It is also known to determine a location of a receiver by using a directional antenna and circuits for determining signal strength. However, such devices do not provide a way to determine what a user is viewing through a transparent display.

Mobile communication devices having displays are well known, for example, cell phones and smart phones that include digital cameras and access to cellular telephone services. Such cellular telephone services provide both voice communication and access to computer networks such as the internet. Mobile communication devices can include global positioning service (GPS) circuits that provide the location of the device on the earth's surface. The mobile communication devices can also include orientation detectors that provide an orientation signal indicating the orientation of the device with respect to the force of gravity or the center of the earth. The orientation signal then provides input to display circuitry that controls the mobile communication device display, for example, so that a user viewing the display in either portrait or landscape mode can view information appropriately displayed on the display. Thus, the absolute location and orientation of the mobile communication device can be determined. However, in the absence of specific location and orientation information with respect to a scene, the relative location and orientation of the mobile communication device with respect to the scene is not determined.

A wide variety of services are provided for mobile cellular communication devices. For example, users can search web-sites on the internet for information on any of a variety of desired topics (e.g. restaurants) relevant to the geographical location of the mobile communication device. The geographic location can be provided, for example, by user input or from a GPS location signal. It is also known to search the internet for images matching an image acquired by a digital camera integrated into a mobile communication device and retrieve information related to the image, for example through the Google Goggles application. Using such services, a user can use a digital camera integrated into his or her mobile communicator to take a picture of an object in the user's vicinity and then search the internet for information related to the object. However, if the view is not distinctive or a comparable image is not found in a search, no information is provided.

Mobile communication devices can be used to enable interactive commerce. For example, auction bidding by telephone has been practiced for many years. More recently, wireless communicators have been proposed for conducting commercial activities. U.S. Pat. No. 7,200,566 entitled "Method and system for local wireless commerce" describes a system and method of conducting commercial activities such as an auction in a rather localized area (such as a shopping mall). Potential consumers located in the local area have a mobile wireless communications device (for example, a smart cellular phone or a 2-way radio or a Bluetooth communication device) including a set of stored instructions allowing the device to be programmed with a set of desired transactions and preferences such as the brands or transaction types which the consumer prefers. Merchants are connected to receive a communication from the communications device and respond to the desired transaction and preferences by proposing goods or services at specific terms such as price. The mobile wireless communications device associated with the potential consumer has the potential to receive communications from merchants (either directly or through an intermediate system) and to transmit a communication back to the merchant indicating the potential offer so that a merchant can revise or improve the offer. In this way, local merchants can be aware of the offers that a consumer receives and can improve on those offers to secure the potential consumer's business. While the actual transaction may be conducted in person at a merchant's establishment, one can envision a system where the transaction is completed through the wireless communication system with the payment occurring through charge or other electronic transaction and the delivery of the goods or service through conventional delivery channels.

U.S. Pat. No. 7,870,022 entitled "System and method for offering and fulfilling situation-based, location specific rewards and offers to mobile-oriented consumers" discloses a system, method and computer-readable medium for advertising and completing a transaction using a credit card or a debit card. The method includes receiving situation information at a device, based on the situation information, transmitting an advertisement to the device, associating an advertisement with an identification card such as a debit card, credit card, student ID card, biometric data, or club card, and receiving an indication of a purchase associated with the advertisement and completed using the card. The disclosure enables a user to receive an advertisement on a device such as a mobile device and then make a purchase decision based on that advertisement in a normal fashion or transparent to the user and sales clerk, without the use of coupons, special codes or any other additional and annoying requirements for making the purchase. The user only needs to use an appropriate identification card. The merchant for the clerk at a point of sale handles the transaction in a standard fashion. The user can then receive a confirmation of a discount for the transaction on the consumer mobile device and later receive a rebate on an identification card statement.

U.S. Pat. No. 7,865,414 entitled "Method, system and computer readable medium for web site account and e-commerce management from a central location" teaches a method, system, and computer readable medium for managing a financial transaction of a user at a merchant including authenticating the user via a device of the user while the user is at the merchant transmitting activation information for activating a reusable, pre-existing, unaltered and permanent credit or debit card account number of the user from the user device to a financial institution for processing financial transactions, while the user is authenticated; submitting a payment request including the account number to the financial institution from the merchant while the account number is activated; and de-activating the account number after the payment request is processed by the financial institution. The financial institution only accepts and processes payment requests received from merchants while the account number is activated, and the financial institution declines payment requests while the account number is de-activated.

U.S. Pat. No. 7,711,598 entitled "Web-based consumer product marketing communication network for managing and delivering consumer product marketing communications to consumers along e-commerce (EC) enabled web sites on the world wide web (WWW), using multi-mode virtual kiosks (MMVKS) driven by server-side components embodying consumer product identifiers and driven by consumer product information (CPI) links managed by product manufacturer team members and/or their agents" describes a Web-based consumer product marketing communication network for managing and delivering consumer product marketing communications to consumers along E-Commerce (EC) enabled Web sites on the World Wide Web (WWW). The network employs one or more Web-based Multi-Mode Virtual Kiosks (MMVKs), each having a plurality of independently programmable display modes, for displaying one or more advertising spots, one or more promotional spots, and a set of consumer product information (CPI) resources through its Web-based graphical user interface (GUI). The network also includes a database server for storing and managing a CPI link structure for each MMVK deployed on the network. Each CPI link structure includes a consumer product identifier assigned to the corresponding consumer product, and a set of URLs specifying the location of a plurality of CPI resources located on the WWW. Members of product management team use the set of URLs to program the programmable display modes of each MMVK. By virtue of the MMVK-driven communication network of the present invention, consumer product management teams can now consistently deliver to product information and brand messaging to consumers along electronic streams of commerce U.S. Pat. No. 7,610,233 entitled "System, method and article of manufacture for initiation of bidding in a virtual trade financial environment" discloses a system, method and article of manufacture provided for initiating bidding in a virtual trade financial environment. First, a form is submitted to a plurality of buyers providing details on products or services available from a plurality of sellers. This is to prompt the submission of bids on the products or services. The bids are then received from the buyers utilizing a network. Thereafter, the bids are categorized based on a predetermined criterion. The categorized bids are subsequently sent to the sellers utilizing the network. Offers are then received from the sellers in response to the bids utilizing the network. The offers are displayed to the buyers for closing transactions between the buyers and the sellers.

SUMMARY OF THE INVENTION

These systems, however, do not provide a direct local communication between a mobile communication device oriented toward a specific location and an information source relevant to a user's field of view or a system for managing information exchanged in such a local communication. There is a need, therefore, for an improved mobile communication device and method for determining the orientation and view of a user with respect to external information-providing devices and to receive only the information appropriate to the user's orientation and view.

In accordance with the present invention, there is provided a mobile communication device adapted to communicate with a plurality of pre-determined sources disposed at pre-determined different locations, comprising:

an identification code;

a receiver adapted to receive wirelessly communicated information from a particular source at a pre-determined location;

an orientation detector that detects the orientation of the receiver relative to the pre-determined location of the particular source to provide an orientation signal indicating that the mobile communication device is oriented toward the predetermined location of the particular source; and an interface circuit responsive to the wirelessly communicated information and the orientation signal to register the identification code with the particular source.

The present invention provides improved local communications to mobile communication device users by providing local communication relevant to a user's field of view, interacting with the user and his or her mobile communication device, and systems for managing the user's interaction information.

BRIEF DESCRIPTION OF THE DRAWINGS

The above and other objects, features, and advantages of the present invention will become more apparent when taken in conjunction with the following description and drawings, wherein identical reference numerals have been used, where possible, to designate identical features that are common to the figures, and wherein:

FIGS. 5A and 5B are an illustration of an orientation detector according to an embodiment of the present invention;

DETAILED DESCRIPTION OF THE INVENTION

Figure 1:
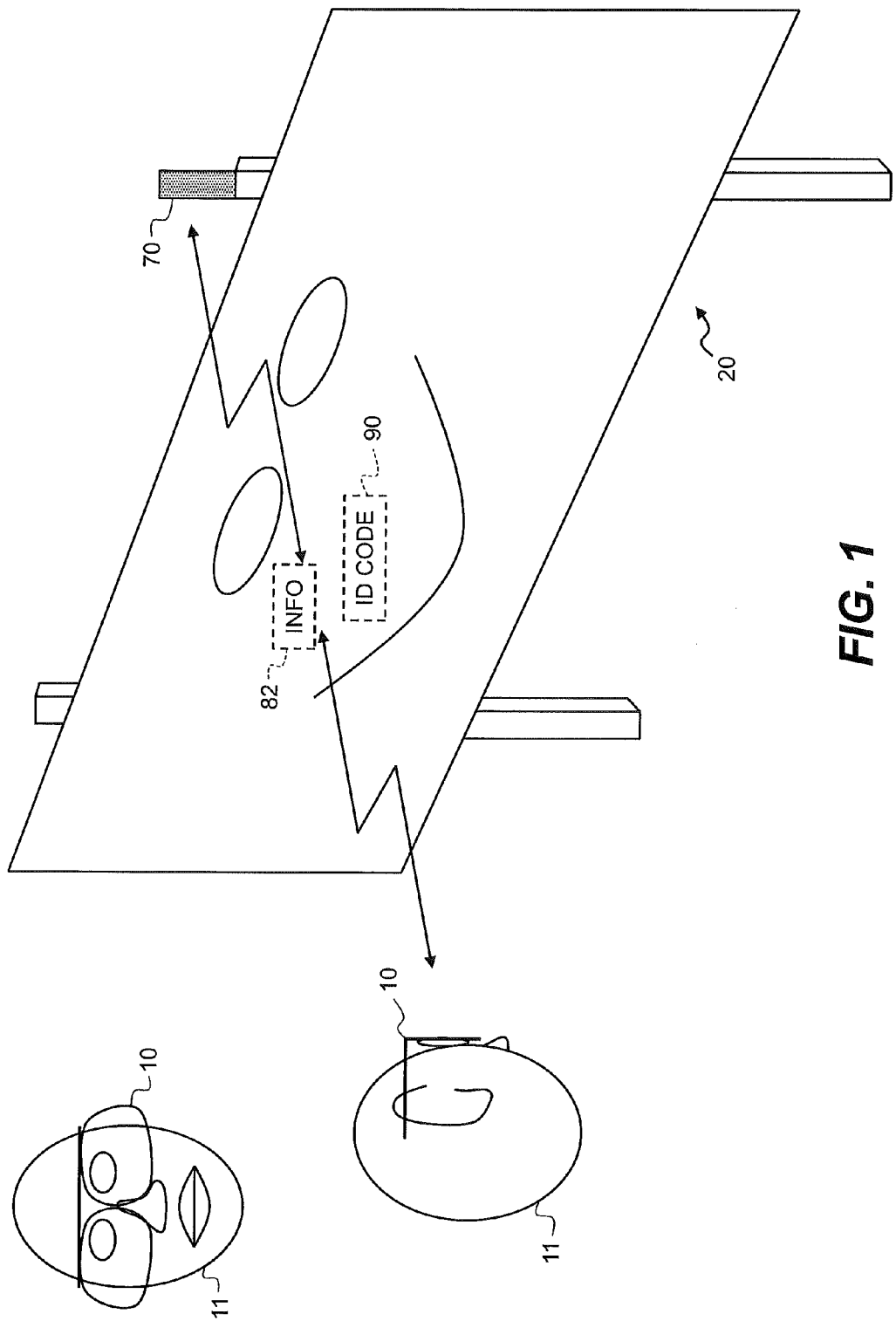
FIG. 1 is a perspective of a user, mobile communication device, and particular information source according to an embodiment of the present invention.
Figure 2:
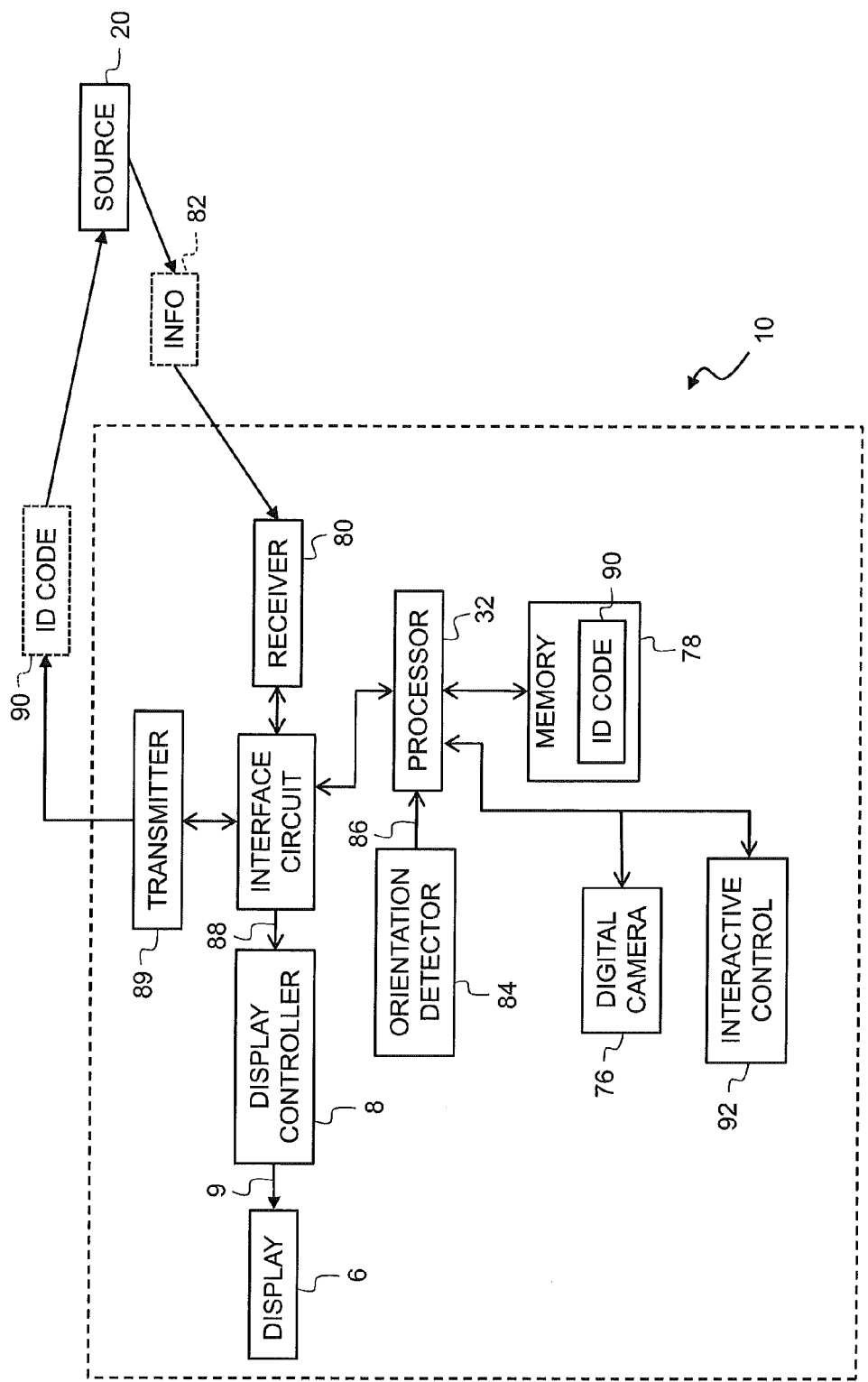
FIG. 2 is a schematic of a mobile communication device according to an embodiment of the present invention.

According to an embodiment of the present invention and as illustrated in FIGS. 1 and 2, a mobile communication device 10 controlled by a user 11 is adapted to communicate with a plurality of pre-determined information sources 20 disposed at pre-determined different locations includes an identification code 90. A receiver 80 wirelessly receives communicated information 82 from a particular information source 20 at a pre-determined location. An orientation detector 84 detects the orientation of the receiver 80 relative to the pre-determined location of the particular information source 20 to provide an orientation signal 86 indicating that the mobile communication device 10 is oriented toward the pre-determined location of the particular information source 20. An interface circuit 88 responsive to the wirelessly communicated information 82 and the orientation signal 86 registers the identification code 90 with the particular information source 20. The communicated information 82 can be visual information suitable for showing in a display and can include images, graphics, and rendered text, as well as audio information. The wirelessly communicated information 82 can be in hypertext markup language.

In another embodiment of the present invention, a mobile communication device 10 adapted to communicate with a plurality of pre-determined information sources 20 disposed at pre-determined different locations includes a receiver 80 adapted to receive wirelessly communicated visual information from a particular information source 20 at a pre-determined location. An orientation detector 84 detects the orientation of the receiver relative to the pre-determined location of the particular information source 20 to provide an orientation signal 86 indicating that the mobile communication device 10 is oriented toward the predetermined location of the particular information source 20. An interface circuit 88 responsive to the wirelessly communicated visual information and the ori-
entation signal present the visual information to a user 11, for example on a display 6 controlled by a display controller 8.

The system of FIG. 2 can be a computer system or embedded processor system, for example including a processor 32 or controller for controlling a memory 78 in which the identification code 90 is stored. The processor 32 can communicate with or incorporate a display controller 8 that controls a display 6 with an image signal 9, for example including a microprojector, other image source, or display that forms an image visible to a user 11 of the mobile communication device 10 on a transparent, semi-transparent, or opaque surface. The processor 32 also communicates with an orientation detector 84 that provides the orientation signal 86. The computer system receives signals from a receiver 80 circuit, and provides information, optionally in response to an optional interactive control 92, for example the identification code 90 to the interface circuit 88 that, in turn, provides information and signals to a transmitter 89 that transmits signals, for example to the particular information source 20. The mobile communication device 10 can include a digital camera 76 that communicates with the processor 32 to capture digital images. The processor 32 can incorporate circuits to perform the various functions described, or the circuits can be separate. For example, display controllers 8, memory 78, and interface circuit 88 can be integrated within a processor or form various circuits separate from the processor 32. The processor 32 can include specifically functional electronic circuits or can use software programs to execute the various functions described herein on a programmable logic circuit, or some combination of software and hardware. Processors and circuits for controlling memories, interacting with receivers and transmitters, and for driving displays are known in the art.

Figure 3:
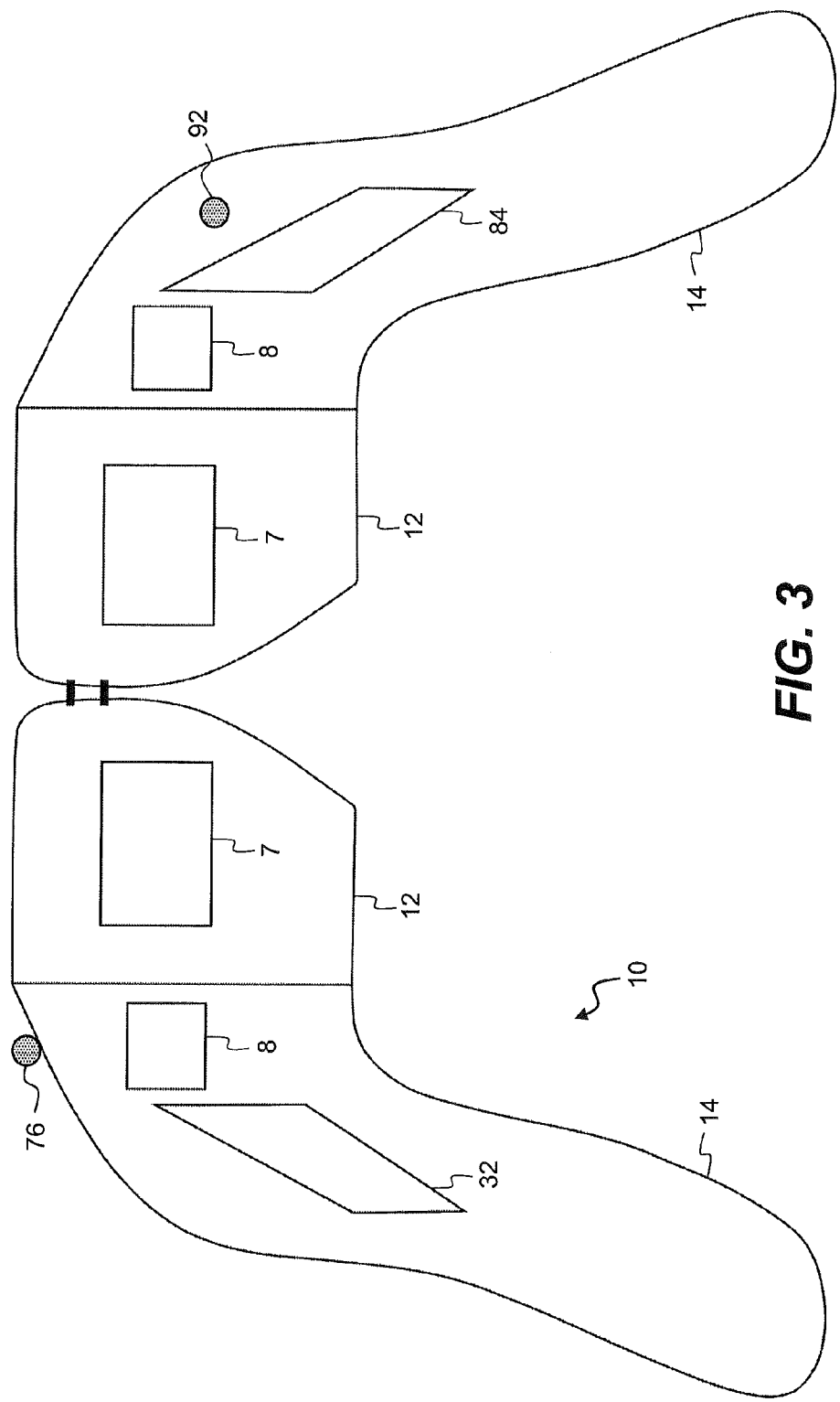
FIG. 3 is an illustration of a head-mounted mobile communication device according to an embodiment of the present invention.

Referring to FIG. 3, in one embodiment of the present invention, the display areas 7 in a display 6 of a lens area 12 are transparent or semi-transparent so that a user 11 of the mobile communication device 10 can see through the display areas 7 to view scenes in his or her line of sight. The display controllers 8 can project images onto the display areas 7 to provide information visible to the user 11, thus providing an augmented reality display. Alternatively, the display controllers 8 can drive a display 6, such as an OLED display, that is at least partially transparent. The orientation detector 84 provides the orientation signal 86 when the transparent or partially transparent display 6 is oriented so that the particular information source 20 can be viewed through the transparent or partially transparent display 6. The mobile communication device 10 can include an interactive control 92 and orientation detector 84.

Alternatively, the display areas 7 are opaque so that a user 11 cannot see through the display areas 7. In this case, the digital camera 76 can be oriented to coincide with the user's visual line of sight. By capturing a digital image of a scene in the user's line of visual sight with the digital camera 76, and using the display controller 8 to provide the digital image to the display areas 7, the user 11 can perceive the scene in his or her line of sight so as to physically navigate through the real world. At the same time, the display controllers 8 can project line-of-sight images onto the display areas 7 to provide information visible to the user 11, thus providing an alternative augmented reality display. The information visible to the user 11 can include at least a portion of the information wirelessly communicated to the mobile communication device 10. Head-mounted, wearable mobile communication devices 10 with display controllers 8, display areas 7, and processors 32 with supportive circuitry are known in the art. Thus, in this embodiment the orientation detector 84 provides the orientation signal 86 in response to a captured line-of-visual-sight scene of the predetermined location of the particular information source 20.

Referring further to FIG. 3, and according to various embodiments of the present invention, the mobile communication device 10 can include the processor 32 and circuitry illustrated in FIG. 2, for example the transmitter 89, interface circuit 88, receiver 80, and memory 78. The processor 32 communicates with the display controller 8 to provide an image signal 9 (FIG. 2) that is displayed on display areas 7 of a display 6 (not shown separately). A user 11 (not shown in FIG. 3) views the image signal 9 (FIG. 2) in the display areas 7. The mobile communication device 10 can include a digital camera 76.

As illustrated in FIG. 3, the mobile communication device 10 is a wearable, head-mounted device with ear pieces 14 for wearing the mobile communication device 10 on a user's head. Thus, the mobile communication device 10 can incorporate an augmented reality system and the display is an augmented reality display.

Figure 4B:
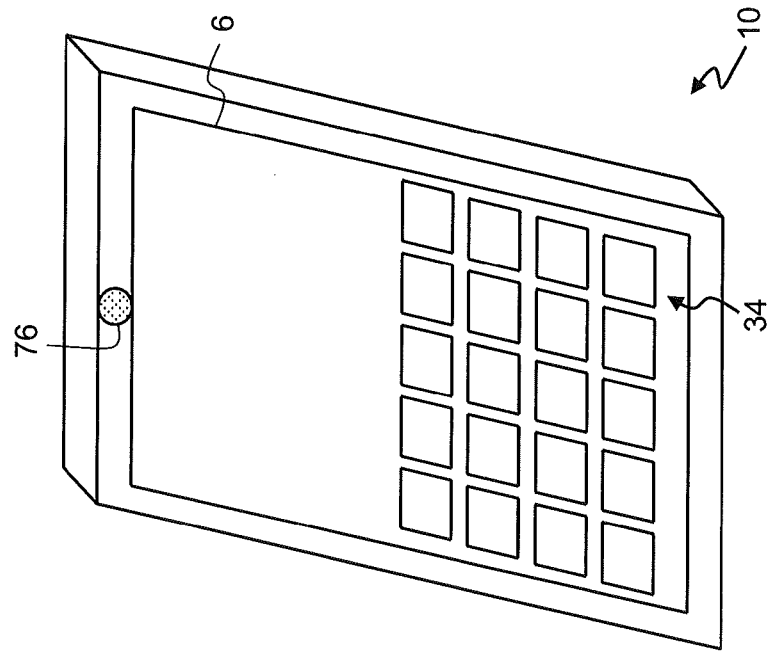
FIGS. 4A and 4B are perspectives of a hand-held mobile communication device according to an embodiment of the present invention.
Figure 4A:
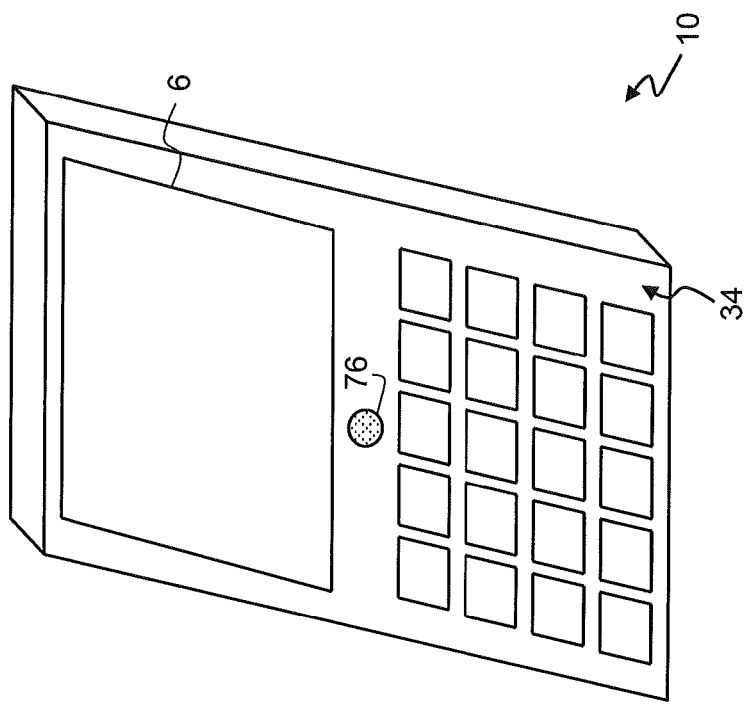

In alternative embodiments of the present invention, shown in FIGS. 4A and 4B, the mobile communication device 10 is a hand-held device that incorporates a display 6 (e.g. a liquid crystal display or organic light-emitting diode display). The mobile communication device 10 can also include a digital camera 76. Information is displayed on the display 6. In FIG. 4A, a user interface 34 (e.g. a keypad) is used to respond to user commands. In FIG. 4B, the user interface 34 is incorporated into the display 6, for example by using a touch screen and image of a keypad to provide user interactivity. Such displays, keypads, and touch screens are known in the art.

In one embodiment of the present invention, the display 6 is transparent or semi-transparent so that a user 11 of the hand-held mobile communication device 10 can see through the display 6 to view scenes in his or her line of sight when the mobile communication device 10 is held in front of a viewer's eyes. The display controllers 8 can display images on the display 6 to provide information visible to the user 11, thus providing a hand-held augmented reality display. Alternatively, the display 6 is opaque so that a user 11 cannot see through the display 6. In this case, the digital camera 76 can be oriented to coincide with the user's line of sight. By capturing a digital image of a scene in the user's line of sight with the digital camera 76, and using the display controller 8 to provide the captured digital image to the display 6, the user 11 can perceive the scene in his or her line of sight. At the same time, the display controllers 8 can display images in the display 6 to provide information visible to the user 11, thus providing an alternative augmented reality display. The digital camera 76 can be mounted on a side of the mobile communication device 10 opposite the display 6, to facilitate orienting the mobile communication device 10 so that the digital camera 10 can record a digital image of a scene in the user's line of sight at the same time as the user 11 views information on the display 6. Such arrangements of displays, digital cameras, and the supporting circuits, processors, and software are known in the art.

Referring to FIG. 1, according to embodiments of the present invention, the mobile communication device 10 interacts with the particular information source 20 when the mobile communication device 10 is oriented toward the predetermined location of the particular information source 20. By oriented toward the particular information source 20 is meant that a user 11 viewing the display 6 (FIG. 2) or looking through the display 6 would see the particular information source 20 in his or her line of sight in the absence of the mobile communication device 10. As shown in FIG. 1, the particular information source 20 is a billboard carrying visible information. In other embodiments, information sources 20 can include buildings, displays, objects, or other scene elements. In an embodiment, mobile communication devices 10 that include transparent or semi-transparent displays 6 (FIG. 2) or display areas 7 are oriented toward the particular information source 20 when a user 11 views the particular information source 20 through the transparent or semi-transparent displays 6 or display areas 7. From the user's perspective, he or she is looking directly at the particular information source 20 through the display 6 and can see the particular information source 20.

Referring to FIGS. 1 and 3, in another embodiment, mobile communication devices 10 that include opaque displays 6 (FIG. 2) or display areas 7 are oriented toward the particular information source 20 when a digital camera 76 in the mobile communication device 10 captures scenes of the particular information source 20 in the viewer's line of sight. Again, from the user's perspective, he or she is looking directly at the particular information source 20 and, although the particular information source 20 cannot be directly seen because of the opaque display 6 (FIG. 2) or display area 7, a digital image of the particular information source 20 aligned with the user's line of sight is presented on the display 6 or display area 7 so that the viewer appears to see the scene before him or her while actually seeing an image of the scene.

In one embodiment of the present invention, the mobile communication device 10 includes an interactive control 92 (FIGS. 2 and 3) to enable the identification code registration with the particular source. In this embodiment, a user 11 of the mobile communication device 10 can manually control the interaction with the particular information source 20 to control the transmission of information, thereby maintaining privacy if so desired.

Existing tools provided in mobile communication devices of the prior art do not provide an orientation signal 86 that indicates when the mobile communication device 10 is oriented toward the predetermined location of the particular information source 20. GPS devices indicate geographical location but do not indicate orientation toward an object or indicate whether a user 11 is viewing a particular location. Orientation detectors for determining portrait or landscape viewing of hand-held displays determine which side of the display 6 is perpendicular to the ground but do not indicate orientation toward a location or indicate whether a user 11 is viewing a particular location. Nor does a combination of a GPS and a portrait/landscape indicator indicate orientation or indicate whether a user 11 is viewing a particular location. Other navigation devices, such as inertial navigation devices used in commercial aircraft or shipping, are impractical for use in mobile communication devices. Compasses are also known but do not provide the necessary orientation signal.

In various embodiments of the present invention, the wireless communication can be electromagnetic or audio and carry visual or aural information incorporated in the wireless communication. An electromagnetic communication can be an optical signal, an infrared signal, an ultra-violet signal, or a directed beam signal. The electromagnetic communication can be a low-power radio broadcast signal. Likewise, an audio signal can be infrasonic or supersonic.

Referring to FIGS. 5A and 5B according to embodiments of the present invention, an orientation detector 84 that detects the orientation of the receiver relative to the predetermined location of the particular information source 20 to provide an orientation signal 86 indicating that the mobile communication device 10 is oriented toward the predetermined location of the particular information source 20 can include a directed electromagnetic beam provided by the particular information source 20. The directed electromagnetic beam 72 can have a low power so that it can only be received locally. The directed beam 72 should have a composition and energy chosen to avoid harm to the local environment, including humans. Directed beams can include electromagnetic radio signals, infra-red signals, ultra-violet signals, and visible optical signals. A directed beam is one that propagates in a specific direction with respect to the particular information source 20 so that if the beam 72 is intercepted, a measurement of the beam direction will indicate the direction of the particular information source 20. In one embodiment, the directed beam 72 originates from the particular information source 20.

In the embodiment of FIG. 5A, the directed beam is an optical beam 72 such as a laser beam. The optical beam 72 can have a frequency that is visible or it can have a frequency that is not visible, for example ultra-violet or infra-red. The optical beam 72 is emitted from the particular information source 20, for example from an emitter 70. The emitter 70 can be hidden or concealed within or near an information source 20. Depending on the arrangement of the particular information source 20, the optical beam 72 can be emitted omni-directionally so that the optical beam 72 can be intercepted from any direction, or in a more limited solid angle to control the area in which the optical beam 72 can be intercepted. The orientation detector 84 includes a detector 200 (for example an optical sensor) arranged to detect the light emitted from the emitter 70. To ensure that the user 11 is properly oriented with respect to the location of the particular information source 20, the receiver 80 is a directional receiver. In an embodiment, the detector 200 is located in a recess that serves to absorb light incident on the detector 200 outside a desired angle. As shown in the embodiment of FIG. 5A, this is accomplished by locating the detector 200 at one end of an open-ended light-absorbing cylinder 210 so that only light emitted from the emitter 70 in a very narrow range of angles will be detected, thereby forming a directed beam sensor that provides an accurate indication of the orientation of the receiver 80. The optical beam 72 can be temporally or frequency modulated to provide information that is detected by the receiver 80. In an embodiment, the information is displayed on the display 6 (FIGS. 2, 4A, 4B) or display areas 7 (FIG. 2) of the mobile communication device 10.

In an alternative embodiment of the present invention, shown in FIG. 5B, the emitted directed beam 72 is temporally modulated with a signal. The receiver 80 includes multiple detectors 200 and phase-discrimination circuitry that compares the phases of the received signal. By measuring the relative phase of the signal received by each of the optical detectors 200, the relative distance of the detectors 200 from the emitter 70 can be determined and the orientation of the detectors 200 with reference to the optical beam 72 determined. For example, if the phases are the same, the detectors 200 are equidistant from the emitter 70. The distance between the detectors 200 and the temporal modulation can be adjusted to control the relationship between the phase and the distance (and hence orientation).

In yet another embodiment of the present invention, more than three detectors 200 are used. If at least one of the three or more detectors 200 is not in a line with the other detectors 200, the three or more detectors 200 can distinguish between orientations that are 180 degrees apart in a common plane. Furthermore, if at least one of the three or more detectors 200 is not in a plane with the other detectors 200, absolute orientation in space can be detected. In the case of a head-mounted mobile communication device 10, the orientation of the mobile communication device 10 with respect to the ground can be reasonably presumed, since a user 11 (FIG. 1) will wear the device on one's head. In this case, absolute orientation in space can be determined with detectors 200 that are in a plane (but not in a line). In the case of a hand-held optical detector, at least one of the detectors 200 should be located outside of a plane including the other detectors 200. Optical detectors 200 and emitters 70 are known in the art, as are electronic and optical circuits for modulating a signal.

In another embodiment, the orientation detector 84 (FIG. 2) includes a directional antenna (not shown) for radio frequency electromagnetic signals. Directional antennas are known in the art, for example including a loop antenna, a multi-element Yagi antenna, or a loop antenna wound around a Ferrite core. Together with a receiver, such equipment is lightweight, easy to operate, and portable.

Figure 6:
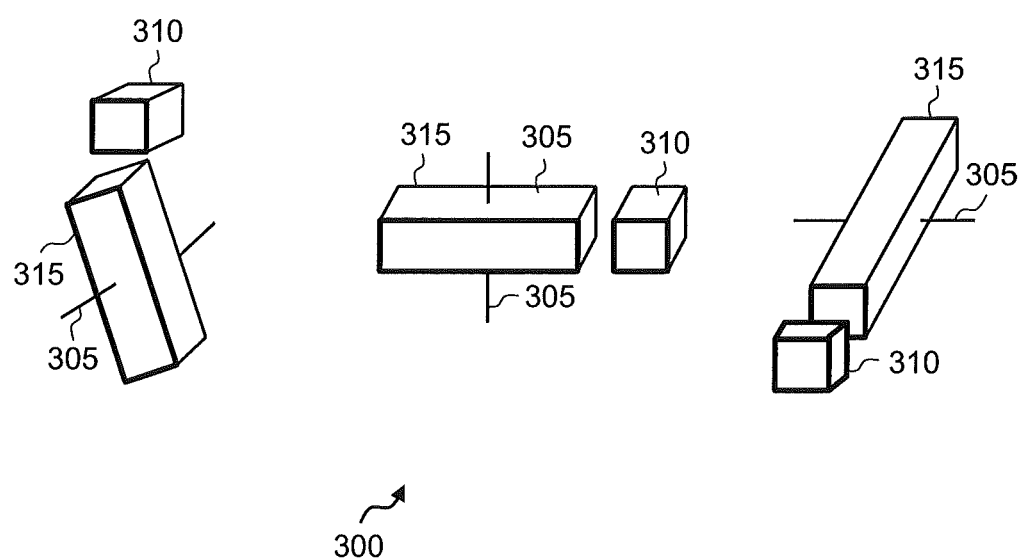
FIG. 6 is an illustration of a three-axis orientation discriminator according to an embodiment of the present invention.

According to an embodiment of the present invention, the mobile communication device 10 includes a GPS. In another embodiment, the mobile communication device 10 includes a three-axis orientation discriminator 300. For example, as shown in the perspective of FIG. 6, a set of three eccentric weights 315 are each suspended by an axial pin 305 oriented in a different dimension. A sensor 310 fixed in position to the mobile communication device 10 (not shown) senses the orientation of the eccentric weight 310 with respect to the mobile communication device 10 (not shown). Although shown for clarity as a single position sensor, sensor 310 can sense the position of the eccentric weight 315 in a plurality of positions, or continuously in any position. As the mobile communication device 10 is rotated in various dimensions, the eccentric weights 315 will maintain their position with respect to the earth's center, due to the effects of gravity. Hence, the relative position of the sensors 310 with respect to the eccentric weights 315 specifies the orientation of the mobile communication device 10 with respect to the direction of gravitational acceleration and the earth's center. The orientation of the mobile communication device, in combination with a GPS, can determine the absolute position and orientation of the mobile communication device 10. In another embodiment of the present invention, the orientation detector 84 includes a magnetic sensor that senses the orientation of the mobile communication device 10 with respect to magnetic lines of force in the earth's magnetic field. In a further embodiment of the present invention, mobile communication device 10 includes an accelerometer. The accelerometer can include acceleration measurement devices for each of three dimensions. Once calibrated and zeroed to a specific location and orientation, the accelerometers form an inertial sensor for navigation. Accelerometers are known in the prior art and are made in very small electronic packages, for example using micro-electromechanical system (MEMS) devices. In one embodiment of the present invention, the inertial navigation system includes an orientation calibration circuit that calibrates the inertial system by comparing the locations of the mobile communication device 10 over time, for example determined through GPS readings. However, the combination of these tools does not provide an orientation signal 86 indicating that the mobile communication device 10 is oriented toward the predetermined location of the particular information source 20, since the exact location and orientation of the information source 20 is not known to the orientation detector 84.

In a further embodiment of the present invention, the wirelessly communicated information 82 from the particular information source 20 at a pre-determined location includes location information of the particular information source 20, for example determined from a GPS signal. The orientation detector 84 can compare the location of the mobile communication device 10 (determined from a GPS) and the particular information source 20 to determine the relative location. Information from an inertial sensor or a magnetic sensor, with the additional information from the three-axis orientation discriminator 300, is used to determine whether the mobile communication device 10 is oriented toward the predetermined location of the particular information source 20. For example, the relative locations of the mobile communication device 10 and the particular information source 20 are determined from the individual GPS information. The three-axis orientation discriminator 300 can determine whether the mobile communication device 10 is oriented in such a manner that a user 11 can use it to look at the particular information source 20. The inertial sensor or magnetic sensor determines whether in fact the mobile communication device 10 is oriented toward the particular information source 20.

In a further embodiment of the present invention, the wirelessly communicated information 82 (FIGS. 1, 2) is an audio signal, for example an ultra- or infra-sonic sound that is received by the receiver 80 (FIG. 2). The audio signal can be modulated with information and phase information can be used to determine the direction of the audio signal.

In various embodiments of the present invention, the wirelessly communicated information 82 (FIG. 2) is transmitted with a signal that is modulated to assist in distinguishing the signal from background noise. For example, an optical beam 72 (FIGS. 5A, 5B) can be modulated to distinguish it from other sources of electromagnetic radiation in the local environment.

Referring back to FIG. 2, in another embodiment of the present invention, the orientation detector 84 includes a time-of-visual-gaze signal and the orientation signal 86 is provided when the time-of-visual-gaze signal exceeds a pre-determined length of time. It is possible for the receiver 80 to receive a wireless communication signal from the particular information source 20 inadvertently or for a very short period of time. Such a short period of time does not indicate an interest or intent to view the particular information source 20 on the part of a user 11 (FIG. 1). Hence, by requiring that the user 11 (FIG. 1) gaze at the particular information source 20 for a pre-determined amount of time, such inadvertent interactions can be avoided. For example, a pre-determined period of time can be one second. The time-of-visual-gaze signal can be formed by incorporating a clock signal into the orientation detector 84 or receiver 80, continuously sensing the wireless communication with the receiver 80 and comparing the elapsed time with the pre-determined period of time, producing the time-of-visual-gaze signal when the elapsed time exceeds the pre-determined period of time. The orientation signal 86 can be produced in response to the time-of-visual-gaze signal and the wirelessly communicated information 82. Clock signals, comparators, and signal generation are known in the electronic arts.

In a further embodiment of the present invention, the mobile communication device 10 includes a storage device (e.g. memory 78 in FIG. 2) in which the receiver 80 receives and stores an information source location identifier associated with the particular information source location 20 in the storage device. The source location identifier is transmitted from the particular information source 20.

In yet another embodiment of the present invention, the mobile communication device 10 includes a cellular telephone.

Figure 7:
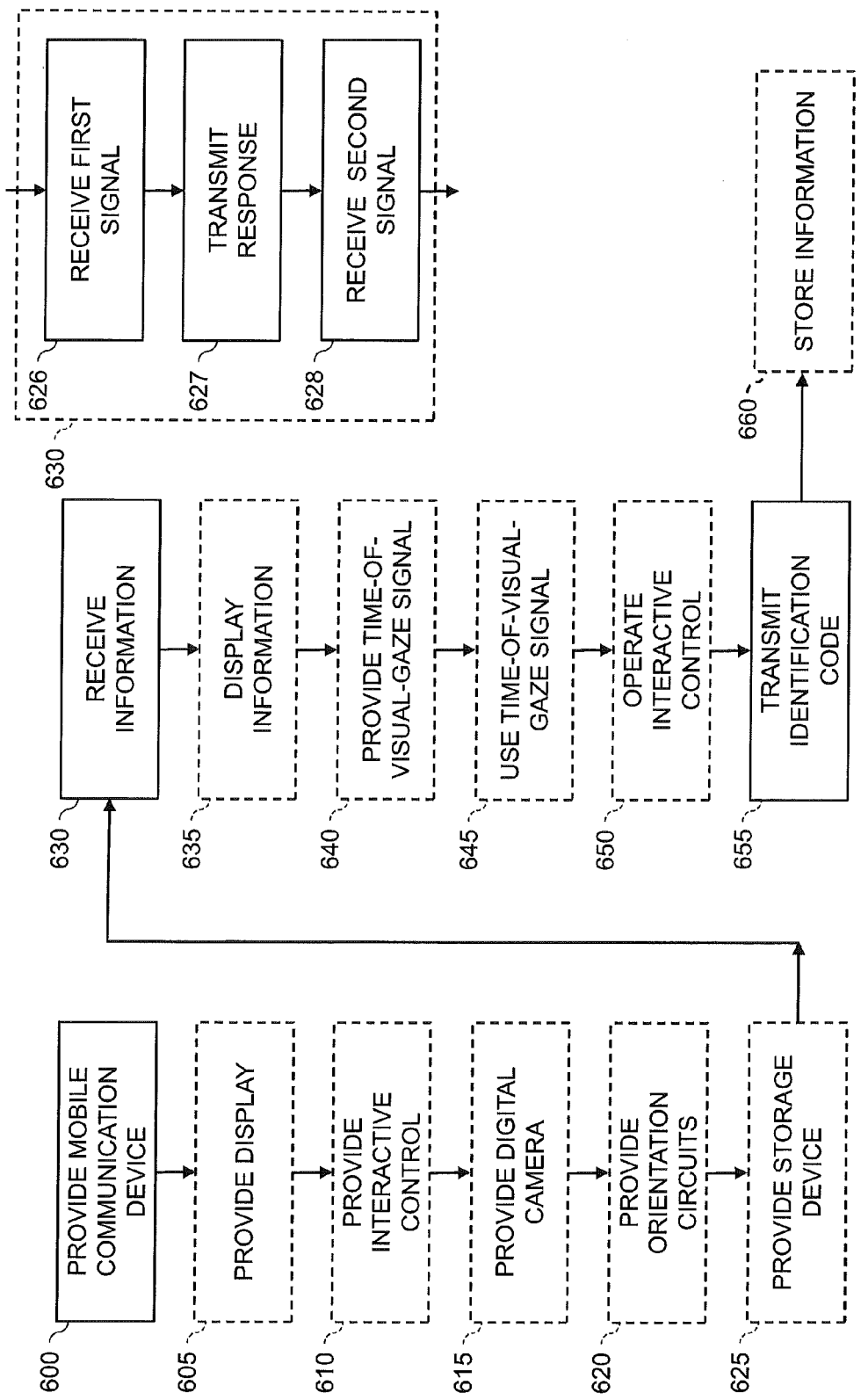
FIG. 7 is a flow diagram of a method according to an embodiment of the present invention.

Referring to FIGS. 7, 1, and 2, a method of the present invention includes communicating with a plurality of pre-determined information sources 20 disposed at pre-determined different locations. A mobile communication device 10 that includes an identification code 90 is provided (step 600). A receiver 80 is adapted to receive wirelessly communicated information 82 from a particular information source 20 at a predetermined location, an orientation detector 84 detects the orientation of the receiver 80 relative to the predetermined location of the particular information source 20 to provide an orientation signal 86 indicating that the mobile communication device 10 is oriented towards the predetermined location of the particular information source 20, and an interface circuit 88 is responsive to the wirelessly communicated information 82 and the orientation signal 86 to register the identification code 90 with the particular information source 20. In step 630, the receiver 80 is used to receive wirelessly communicated information 82 from the particular information source location. In step 655, the interface circuit 88 is used to transmit the identification code 90 when the mobile communication device 10 is oriented towards the particular information source location 20.

Figure 8:
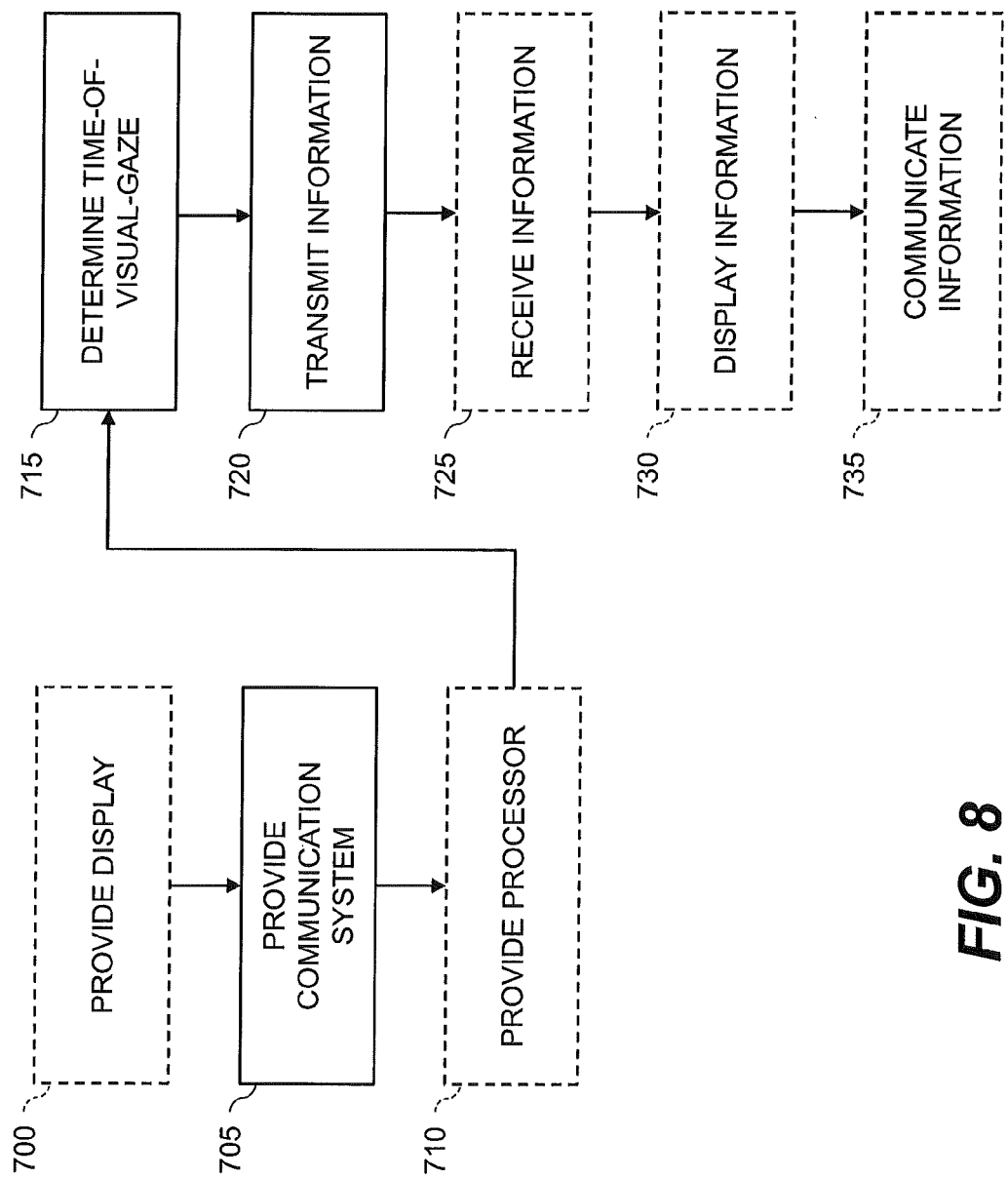
FIG. 8 is another flow diagram of a method according to an embodiment of the present invention.
Figure 11:
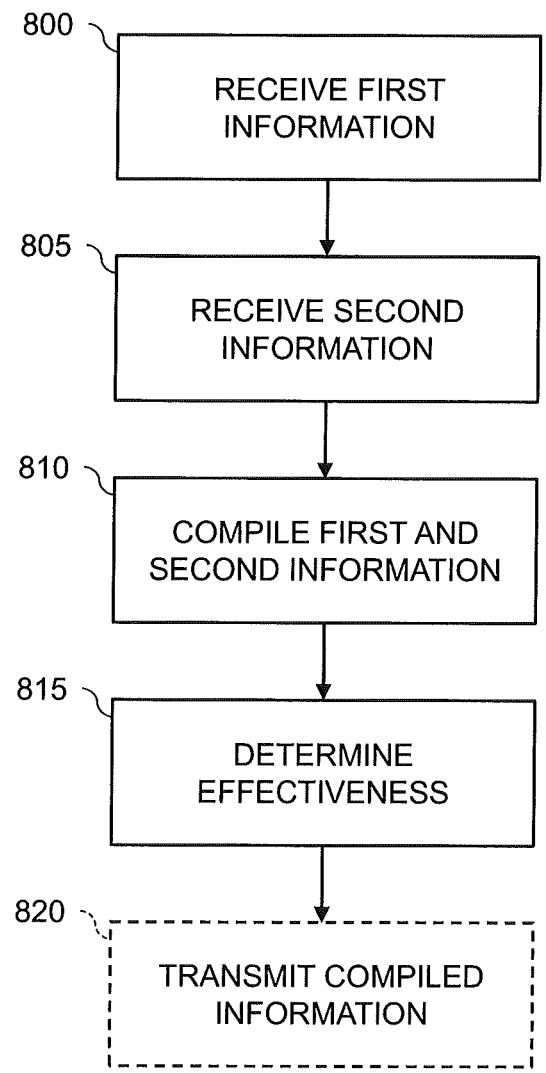
FIG. 11 is a flow diagram illustrating a method according to an embodiment of the present invention.

In a further embodiment of a method of the present invention, an interactive control 92 is provided in optional step 610 to enable identification code 90 registration with the particular information source 20 and the interactive control 92 is used in step 650 to enable the identification code registration with the particular information source 20. In FIGS. 7, 8, 11 optional steps are illustrated with dashed rectangles.

In yet another embodiment of a method of the present invention, a display 6 controlled by the interface circuit 88 is provided in optional step 605 and optionally used to display at least a portion of the wirelessly communicated information 82 in step 635. The display 6 can be provided as a partially transparent display and the partially transparent display used to view the particular information source 20 through the partially transparent display 6 when the orientation detector 84 provides the orientation signal 86.

In another embodiment of a method of the present invention, a digital camera 76 for capturing a line-of-visual-sight scene and circuitry for displaying the line-of-visual-sight scene on the display 6 is provided in optional step 615. The orientation detector 84 is used to provide the orientation signal 86 in response to a captured line-of-visual-sight scene of the predetermined location of the particular information source 20.

In other embodiments of the method of the present invention, orientation detection circuits are provided in optional step 620. The orientation circuits can include an inertial sensor, an orientation calibration circuit, and a global positioning system receiver that provides a GPS signal. Signals from the inertial sensor are used by the orientation detector 84 and the orientation calibration circuit to calibrate the inertial sensor with the GPS signal. Signals from the inertial sensor and the GPS are used by the orientation detector 84 to provide the orientation signal 86.

In a further embodiment of the present invention, the method includes providing a time-of-visual-gaze signal in the orientation detector in optional step 640 and using the orientation detector in optional step 645 to provide the orientation signal 86 when the time-of-visual-gaze signal exceeds a pre-determined length of time.

Another embodiment of the present invention further includes providing a storage device (e.g. memory 78) in step 625 and receiving and using the memory 78 to store an information source location identifier associated with the particular information source location 20 in step 660. Other information can also be stored in the memory 78.

In order to save energy and reduce unnecessary communication, in another embodiment of the present invention, the communication (step 630) between the mobile communication device 10 and the particular information source 20 of information can be performed in multiple steps. The receiver 80 can be used to receive a first signal in step 626, the transmitter 89 used to transmit a response in step 627 to complete a communication handshake, and then the receiver 80 is used to receive the wirelessly communicated information 82 with a second signal in step 628. Moreover, the wirelessly communicated information 82 can be communicated using a different communication mode from the initial first signal. The first signal, for example, can be communicated through an optical, directional beam to establish the receiver 80 orientation. Once the orientation is established, another way of communication, such as a WiFi local area network can be used to communicate the wireless information. Transmission and receiver circuitry, communication protocols, and handshakes for point-to-point communication, broadcast communication, and network communication are known in the art.

As intended herein, wirelessly communicating information between mobile communication devices 10 and information sources 20 includes, but is not limited to, multiple, separate transfers of information at different times using different communication modalities. In particular, an initial interaction between a mobile communication device 10 and an information source 20 includes a first interaction with a first signal to establish that further interactions are desired (e.g. 626) and a second interaction with a second signal to communicate information (e.g. 628). The first interaction can rely upon a signal designed to determine a mutual orientation and the second interaction can rely upon a non-orientation-dependent communication, such as a WiFi-mediated local area computer network.

Figure 10:
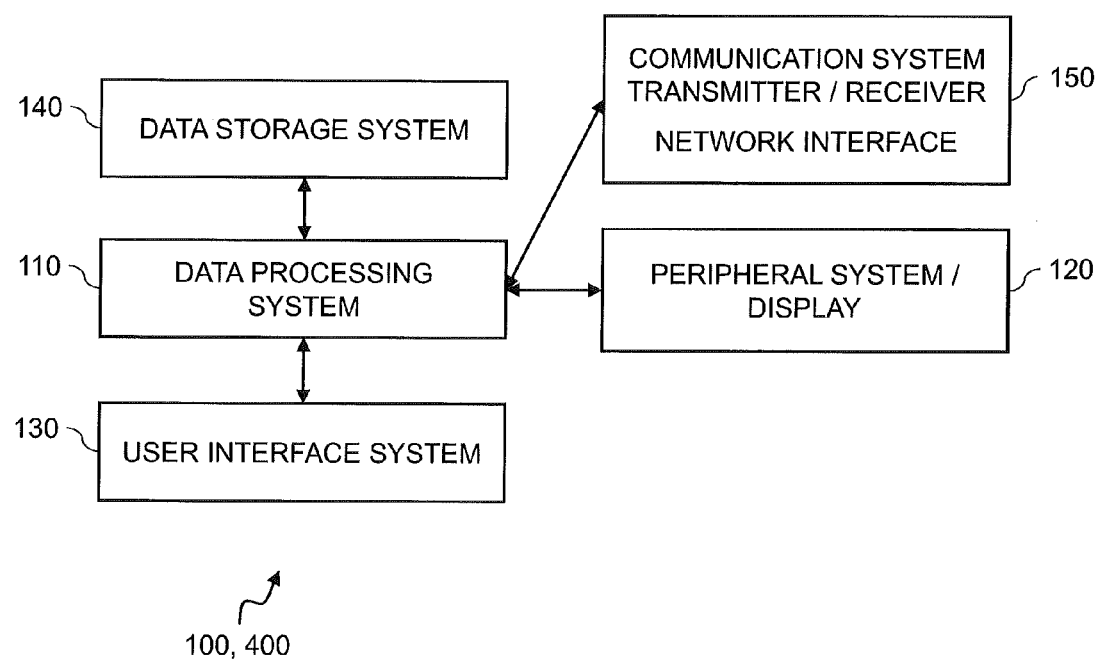
FIG. 10 is a schematic of a computer system useful with various embodiments of the present invention.

In a further embodiment of the present invention and as illustrated in FIGS. 1 and 10, a particular information source 20 is adapted to be in communication with a plurality of users 11, for example users 11 wearing or using a mobile communication device 10. The communication can be wireless, electromagnetic, or directed in a directed beam and is complementary to circuits in the mobile communication device 10. The information source 20 includes a receiver (e.g. part of the communication system 150) adapted to determine a time-of-visual-gaze duration of a user 11 viewing the information source 20. The information source 20 includes a transmitter (e.g. part of the communication system 150) adapted to wirelessly transmit information to the user 11 when a time-of-visual-gaze duration exceeds a pre-determined value.

The particular information source 20 can determine that the time-of-visual gaze duration of a user 11 exceed a pre-determined threshold by receiving such an indication from the user 11 or, for example, from a mobile communication device 10 carried by the user 11. Alternatively, the information source 20 includes a circuit for detecting when a user 11 is viewing the information source 20. Such a circuit can be responsive to a signal interaction with a mobile communication device 10. For example, a pre-determined period of time can be one second. The time-of-visual-gaze duration can be formed by incorporating a clock signal into the information source 20, continuously sensing the wireless communication with the mobile communication device 20 and comparing the elapsed time exceeds the pre-determined period of time, producing the time-of-visual-gaze signal. The orientation signal 86 (FIG. 2) can be produced in response to the time-of-visual-gaze signal and the wirelessly communicated information 82. Clock signals, comparators, and signal generation are known in the electronic arts.

In various embodiments of the present invention, particular information source 20 can carry visible information, such as a billboard or an indoor or outdoor display such as an LED display. The visible information presented can include, for example, information relevant to the wirelessly communicated information 82 or information received from a local mobile communication device 10. For example, the visible information can include user identification information or information of known particular interest to a user 11.

The particular information source 20 can be a recognizable object, a store front, or a building. The particular information source 20 can be any structure that provides wireless communication that can be received by the mobile communication device 10. The wireless communication can be provided by an emitter 70, for example emitting electromagnetic signals such as optical signals, optical beams, or radio signals. The wireless signals can be audio signals. The wireless communication can be modulated to avoid noise in the local environment and enable the receiver 80 (FIG. 2) to filter out other wireless emissions. The emitter 70 can be located in, on, or above a structure as part of the particular information source 20.

The information source 20 can receive, compile, store, or communicate user identification information or time-of-gaze information using a processor, memory, and communication interface, for example a computer network. Such information can detail the number of users 11 that looked at the information source 20 and who the users 11 are. The information can then be communicated to a central information repository and used to optimize the efficiency of the information source 20, for example by controlling the information presented or location of the information source 20.

Figure 9:
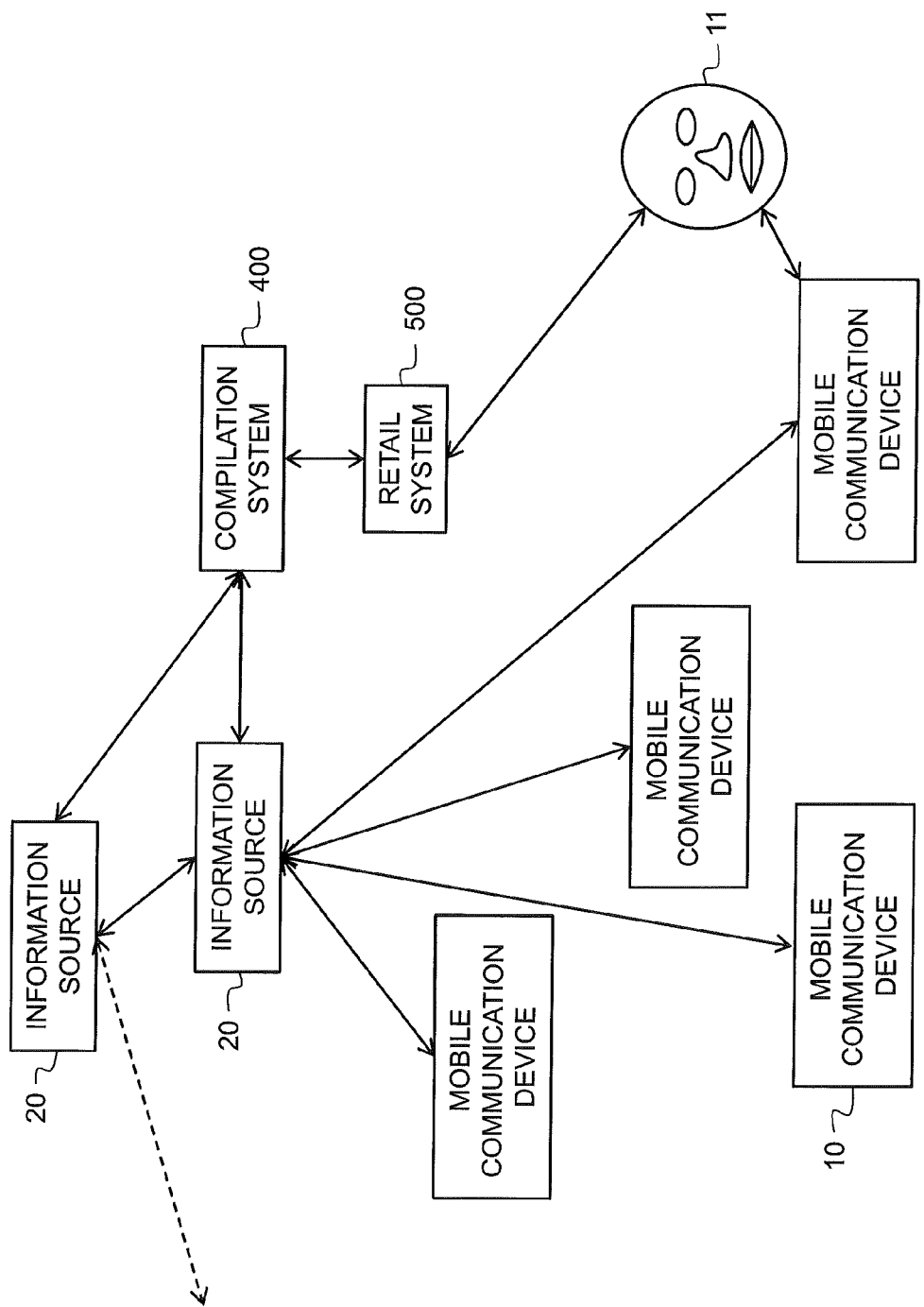
FIG. 9 is a schematic of a mobile communication device and information source system according to an embodiment of the present invention.

Referring to FIG. 9, each information source 20 among a plurality of such information sources 20 can store information locally and can also share the information with other information sources 20, for example to provide information about particular users 11 so that the users 11 can be recognized. Thus, in various embodiments, the information source transmitter is adapted to transmit user identification information to a remote processor through a computer network and the information source receiver is adapted to receive user identification information from a remote processor through a computer network. Locally stored user-customized information can be wirelessly transmitted by the transmitter to the user 11. The information sources 20 can intercommunicate and communicate with other devices on the computer network.

The particular information source 20 can include a computer system 100, for example as illustrated in FIG. 10. FIG. 10 is a diagram showing the components of a system useful for reading, using, and mobile communication device 10 according to various embodiments of the present invention. The system includes a data processing system 110, a peripheral system 120, a user interface system 130, a communication system 150, and a data storage system 140. The peripheral system 120, the user interface system 130, the communication system 150, and the data storage system 140 are communicatively connected to the data processing system 110. The data processing system 110 includes a processor.

The communication system 150 can include a transmitter and receiver for transmitting and receiving wireless communications. In particular, the information source transmitter can wirelessly communicate information to the receiver 80 of a mobile communication device 10 and the information source receiver can receive information sent from the transmitter 89 of the mobile communication device 10. The peripheral system 120 can also include a computer network interface, for example a network interface to the internet. The computer network interface can also include support for wireless networking, for example with WiFi support for a computer local area network. In one embodiment of the present invention, the mobile communication device 10 includes wireless local area network circuits, for example in the receiver and transmitter circuits 80, 89 and communicates through the wireless local area network with the particular information source 20. Using the wireless local area network circuit, the mobile communication device 10 can communicate with the particular information source 20. The communication can be a part of the wirelessly communicated information 82

The data processing system 110 includes one or more data processing devices that implement the processes of the various embodiments of the present invention, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, a digital picture frame, cellular phone, a smart phone or any other device for processing data, managing data, communicating data, or handling data, whether implemented with electrical, magnetic, optical, biological components, or otherwise.

The data storage system 140 includes one or more processor-accessible memories configured to store information, including the information needed to execute the processes of the various embodiments of the present invention, including the example processes described herein. The data storage system 140 can be a distributed processor-accessible memory system including multiple processor-accessible memories communicatively connected to the data processing system 110 via a plurality of computers or devices. On the other hand, the data storage system 140 need not be a distributed processor-accessible memory system and, consequently, can include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, caches, floppy disks, hard disks, Compact Discs, DVDs, flash memories, ROMs, and RAMs.

The phrase "communicatively connected" is intended to include any type of connection, whether wired or wireless, between devices, data processors, or programs in which data is communicated. The phrase "communicatively connected" is intended to include a connection between devices or programs within a single data processor, a connection between devices or programs located in different data processors, and a connection between devices not located in data processors at all. In this regard, although the data storage system 140 is shown separately from the data processing system 110, one skilled in the art will appreciate that the data storage system 140 can be stored completely or partially within the data processing system 110. Further in this regard, although the peripheral system 120 and the user interface system 130 are shown separately from the data processing system 110, one skilled in the art will appreciate that one or both of such systems can be stored completely or partially within the data processing system 110.

The peripheral system 120 can include one or more devices configured to provide digital content records to the data processing system 110. For example, the peripheral system 120 can include digital still cameras, digital video cameras, cellular phones, smart phones, or other data processors. The data processing system 110, upon receipt of digital content records from a device in the peripheral system 120, can store such digital content records in the data storage system 140.

The user interface system 130 can include a mouse, a keyboard, another computer, or any device or combination of devices from which data is input to the data processing system 110. In this regard, although the peripheral system 120 is shown separately from the user interface system 130, the peripheral system 120 can be included as part of the user interface system 130.

The user interface system 130 also can include a display device, a processor-accessible memory, or any device or combination of devices to which data is output by the data processing system 110. In this regard, if the user interface system 130 includes a processor-accessible memory, such memory can be part of the data storage system 140 even though the user interface system 130 and the data storage system 140 are shown separately in FIG. 10.

According to an embodiment of a method of the present invention and as illustrated in FIG. 8, a method of communicating information from an information source 20 to a plurality of users 11 includes providing a communication system (e.g. 150 in FIG. 10) that includes a receiver 80 and transmitter 89 in step 705 and using the receiver 80 to determine a time-of-visual-gaze duration of a user 11 viewing the information source device 20 in step 715. The transmitter is used to wirelessly transmit information to the user 11 when the time-of-visual-gaze duration exceeds a pre-determined value in step 720. The time-of-visual-gaze duration of a user 11 viewing the information source device 20 can be determined simply by receiving a signal from the user 11 indicating that the user 11 has gazed at the information source device 20 for the pre-determined amount of time.

In a further embodiment of the present invention, a peripheral system display (e.g. 120 in FIG. 10) is provided in step 700 for displaying information to the plurality of users 11 and using the peripheral system display 120 to display information on the peripheral system display 120 to the plurality of users 11 in step 730. The displayed information can be received from a user 11 or derived from, or related to, information received from the user 11 in step 725. Additional information, for example user information, can be communicated in step 735.

In another embodiment, a processor (e.g. a component of 110 in FIG. 10) is provided in step 710 and used to compile, store, or communicate user time-of-gaze information. The processor 110 can communicate user time-of-gaze information to a remote processor through a computer network, such as the internet. The remote processor can aggregate information from the different image sources, particularly with respect to information obtained from users 11 through mobile communication devices 10. For example, user identification information for users 11 can be obtained and stored, compiled, and transmitted. It is also useful to count the number, types, and times of interactions with users 11. The processor 110 can communicate user identification information, information relating to interactions with users 11, and aggregated user information.

In another embodiment of the present invention, the information source display displays information related to users 11 that interact with the information source 20. The information can be received from a remote processor through a computer network. For example, if a user 11 is identified at a particular information source 20, but the particular information source 20 does not have any information related to the user 11, information can be requested and obtained from other information sources 20 or a central information repository. Furthermore, the information source transmitter can transmit user-customized information to the user 11.

Referring to FIGS. 9 and 10, a system incorporating mobile communication devices 10 and information sources 20 can also include a system 400 for compiling information indicating that an identified user 11 has been in communication with at least one of a plurality of differently located and identified information sources 20 comprising a receiver 80 (e.g. part of communication system 150) for receiving first information that an identified user 11 has been in communication with at least one of the plurality of differently located and identified information sources 20 and for receiving second information that the identified user 11 has interacted with the first information and a processor (e.g. part of data processing system 110) for compiling the first and second information to determine the relative effectiveness of the identified information source 20. The processor 100 and receiver 80 can be part of the computer system 400.

As shown in FIG. 9, the system 400 for compiling information can communicate through a computer network to a plurality of information sources 20. Information is received from the information sources 20 and organized, for example by counting the number and type of interactions at each information source 20, and information regarding users 11 who observe the information sources 20 using their mobile communication devices 10. The compiled information assists in determining which information sources 20 have the greatest usage and what type of usage occurs.

Furthermore, the system 400 for compiling information receives information from a second type of sources, for example retail systems 500 in retail shops. Retail shops generally accumulate information concerning products sold and purchased. This information is accumulated in a processor similar to that of FIG. 10 and is communicated to the system 400 for compiling information, for example through a computer network. By combining purchase information, user information, and information source information, the effectiveness of wirelessly communicated information 82 to mobile communication devices 10 from information sources 20 can be determined. This information can, in turn, be transmitted by a transmitter 89 to one or more of the differently located and identified information sources 20 or to a processor 110 controlling or communicating with one or more of the plurality of differently located and identified information sources 20 (for example a central controller for a plurality of information sources 20).

Referring to FIG. 11, in a further method of the present invention, a method for compiling information indicating that an identified user 11 has been in communication with at least one of a plurality of differently located and identified information sources 20 includes using a receiver in step 800 to receive first information that an identified user 11 has been in communication with at least one of the plurality of differently located and identified information sources 20, using a receiver in step 805 to receive second information that the identified user 11 has interacted with the first information, and using a processor in step 810 to compile the first and second information to determine the relative effectiveness (step 815) of the identified information source 20. The compiled information and relative effectiveness determination can be transmitted to the information sources 20 or a controller of the information sources 20 (Step 820), such as a remote processor in communication over a network (such as the internet) with the information sources 20.

The receiver 80 can receive the first information from one or more first information sources 20 and receive the second information from one or more second sources information 20 different from the one or more first sources 20. The receiver 80 can receive the first information or the second information through a computer network and through a wired communication or a wireless communication.

The present invention can be applied to augmented reality devices and communication systems to provide improved local communications to mobile communication device users 11 by providing local communication relevant to a user's field of view, interacting with the user 11 and his or her mobile communication device 10, and systems for managing the user's interaction information.

For example, a user 11 can wear or carry an augmented reality mobile communication device 10 having a display 6 that permits a user 11 to see the real world and that displays information to the user 11. As the user 11 moves from location to location, he or she can view various objects in the real world through or with the display 6. Some of the objects are information sources 20, for example billboards (either conventionally passive displays or active displays) and store fronts that broadcast a signal in the user's location. The mobile communication device 10 determines whether the user 11 is viewing the object through or with the display 6 using the orientation detector 84 as described above. If the user 11 is viewing the object through or with the display 6 for a sufficiently long period of time, and provides permission with the interactive control 92, the mobile communication device 10 wirelessly communicates interactively with the information source 20 to receive information. The information can be, for example, advertising for products, events, or locations. If the user 11 also enables user identification information to be transmitted to the information source 20, the information source 20 can customize the information communicated to the user 11 or can customize information displayed on the object. Thus, an information source display 6 can provide a message customized to a user 11 viewing the display 6. For example, special purchase offers can be presented on the image source display or communicated wirelessly to a user 11 for viewing in an augmented reality display 6 in a user's mobile communication device 10. The special purchase offers can be customized to a user's known interests or purchasing history.

The information sources 20 can store and aggregate user interaction information, including identification, time, message, and location. Information from multiple information sources 20 can be further compiled at a central location, for example a remote processor connected by the internet to the image sources 20.

The user 11 can choose to act on the wirelessly communication information, for example by purchasing a product at a retail store. The retail store records the user identification and purchase information. This information is then transmitted to a processor for compiling the information garnered from the retail store and from the information sources 20.

The compiled information can be used to improve the efficiency of the information sources 20, the retail stores, and the products. By collating user purchase information with user interaction with information sources 20, it can be determined whether a user purchased a product after viewing wirelessly communicated information 82 from an information source 20. It can also be determined which information sources 20 are viewed most often and by which users 11 and how many of the users 11 subsequently purchased products related to the wirelessly communicated information 82 or information displayed on the information source 20. The information source locations and messages can thus be chosen to improve the likelihood of users 11 purchasing advertised products. In particular, by compiling purchase information and information source data, it is possible for separate operators of a retail store and an advertising device to share any revenue from sales to a particular individual.

The present invention provides apparatuses and methods for specifically communicating with particular individuals without the cost of communicating with a broader group. The communications can be integrated with purchase behavior to improve the effectiveness of the communications.

The invention has been described in detail with particular reference to certain preferred embodiments thereof, but it will be understood that variations and modifications can be effected within the spirit and scope of the invention.

PARTS LIST 6 display
7 display areas
8 display controller
9 image signal
10 mobile communication device
11 user
12 lens area or viewing area
14 ear pieces
20 information source
32 processor
34 user interface
70 emitter
72 beam
76 digital camera
78 memory
80 receiver
82 communicated information
84 orientation detector
86 orientation signal
88 interface circuit
89 transmitter
90 identification code
92 interactive control
100 computer system
110 data processing system/processor
120 peripheral system/display
130 user interface system
140 data storage system
150 communication system
200 detector
210 cylinder
300 three-axis orientation discriminator
305 axial pin
310 sensor
315 eccentric weight
400 compilation system
500 retail system
600 provide mobile communication device step
605 provide display step
610 provide interactive control step
615 provide digital camera step
620 provide orientation detection circuits step
625 storage device step
626 receive first signal step
627 transmit response step
628 receive second signal step
630 receive information step
635 display information step
640 provide time-of-visual-gaze signal step
645 use time-of-visual-gaze signal step
650 operate interactive control step
655 transmit identification code step
660 store information step
700 provide display step
705 provide communication system step
710 provide processor step
715 determine time-of-visual-gaze step
720 transmit information step
725 receive information step
730 display information step
735 communicate information step
800 receive first information step
805 receive second information step
810 compile first and second information step
815 determine effectiveness step
820 transmit compiled information step

The invention claimed is:

1. A mobile communication device adapted to communicate with a plurality of pre-determined sources disposed at pre-determined different locations, comprising:
an identification code;
a receiver adapted to receive wirelessly communicated information from a particular source at a pre-determined location;
an orientation detector that detects the orientation of the receiver relative to the pre-determined location of the particular source to provide an orientation signal indicating that the mobile communication device is oriented toward the predetermined location of the particular source;
an interface circuit responsive to the wirelessly communicated information and the orientation signal to register the identification code with the particular source; and
a display for displaying at least a portion of the received wirelessly communicated information overlaid on a scene corresponding to the orientation of the mobile communication device.

2. The device of claim 1, wherein the mobile communication device is a head-worn device or is a hand-held device.

3. The device of claim 1, further including an interactive control to enable the identification code registration with the particular source.

4. The device of claim 1, wherein the display is at least partially transparent.

5. The device of claim 4, wherein the orientation detector provides the orientation signal when the partially transparent display is oriented so that the particular source can be viewed through the partially transparent display.

6. The device of claim 1, further including a digital camera for capturing a line-of-visual-sight scene and circuitry for displaying the line-of-visual-sight scene on the display.

7. The device of claim 6, wherein the orientation detector provides the orientation signal in response to a captured line-of-visual-sight scene of the predetermined location of the particular source.

8. The device of claim 1, further including a display portion that is at least partially transparent and wherein the orientation detector provides the orientation signal when the at least partially transparent display portion is oriented so that the predetermined location of the particular source is viewed through the at least partially transparent display portion.

9. The system of claim 1, wherein the wireless communication includes visual or aural information.

10. The system of claim 1, wherein the wireless communication is an electromagnetic communication.

11. The device of claim 10, wherein the electromagnetic communication is a visible optical signal, an infrared optical signal, an optical ultra-violet signal, or a directed-beam signal.

12. The device of claim 11, further including a directed-beam sensor located in a light-absorbing recess that detects the direction of the directed-beam signal.

13. The device of claim 1, wherein the orientation detector includes a three-axis orientation discriminator, an inertial sensor, a directional antenna, a magnetic force-field detector, a global positioning system receiver that provides a GPS signal, a phase-discrimination circuit, or one or more directed beam sensors.

14. The device of claim 13, wherein the orientation detector includes a circuit that combines the GPS signal with the three-axis orientation discriminator, the inertial sensor, or the magnetic force field detector to provide the orientation signal.

15. The device of claim 13, wherein the orientation detector includes an orientation calibration circuit that uses the GPS signal to calibrate the inertial sensor.

16. The device of claim 1, wherein the orientation detector includes a time-of-visual-gaze signal and the orientation signal is provided when the time-of-visual-gaze signal exceeds a pre-determined length of time.

17. The device of claim 1, wherein the wirelessly transmitted communication is a low-power radio broadcast signal.

18. The device of claim 1, further including a storage device and wherein the receiver receives and stores a source location identifier associated with the particular source location in the storage device.

19. The device of claim 1, wherein the mobile communication device includes a cellular telephone.

20. The device of claim 1, wherein the mobile communication device includes a wireless interconnection to a local area computer network.

21. The device of claim 1, wherein the wirelessly communicated information is coded in hypertext markup language.

22. The device of claim 1, wherein the particular source provides a directed electromagnetic beam and the orientation detector includes a beam direction measurement indicating the direction of the particular source.

23. A method of communicating with a plurality of pre-determined sources disposed at pre-determined different locations, comprising:
   providing a mobile communication device that includes an identification code, a receiver adapted to receive wirelessly communicated information from a particular source at a predetermined location, an orientation detector that detects the orientation of the receiver relative to the predetermined location of the particular source to provide an orientation signal indicating that the mobile communication device is oriented towards the predetermined location of the particular source, an interface circuit responsive to the wirelessly communicated information and the orientation signal to register the identification code with the particular source, and a display for displaying the received wirelessly communicated information overlaid on a scene corresponding to the orientation of the mobile communication device;
   using the receiver to receive wirelessly communicated information from the particular source location;
   using the interface circuit to transmit the identification code when the mobile communication device is oriented towards the source location; and
   displaying at least a portion of the received wirelessly communicated information overlaid on a scene corresponding to the orientation of the mobile communication device.

24. The method of claim 23, further including providing an interactive control to enable the identification code registration with the particular source and using the interactive control to enable the identification code registration with the particular source.

25. The method of claim 23, further including providing a partially transparent display and using the partially transparent display to view the particular source through the partially transparent display when the orientation detector provides the orientation signal.

26. The method of claim 23, further including providing a digital camera for capturing a line-of-visual-sight scene and circuitry for displaying the line-of-visual-sight scene on the display and using the orientation detector to provide the orientation signal in response to a captured line-of-visual-sight scene of the predetermined location of the particular source.

27. The method of claim 23, further including providing a portion that is at least partially transparent and using the partially transparent portion to view the predetermined location of the particular source through the at least partially transparent portion when the orientation detector provides the orientation signal.

28. The method of claim 23, further including providing a three-axis orientation discriminator, an inertial sensor, an orientation calibration circuit, a magnetic force-field detector, a phase-discrimination circuit, one or more directed beam sensors, or a global positioning system receiver that provides a GPS signal.

29. The method of claim 28, further including providing an orientation calibration circuit to calibrate the inertial sensor with the GPS signal.

30. The method of claim 28, further including providing a circuit that combines the GPS signal with the three-axis orientation discriminator, the inertial sensor, or the magnetic force field detector to provide the orientation signal.

31. The method of claim 23, further including providing a time-of-visual-gaze signal in the orientation detector and using the orientation detector to provide the orientation signal when the time-of-visual-gaze signal exceeds a pre-determined length of time.

32. The method of claim 23, further including providing a storage device and receiving and using the storage device to store a source location identifier associated with the particular source location.

33. The method of claim 23, further including using the receiver to receive a first signal, using the transmitter to transmit a response, and then using the receiver to receive the wirelessly communicated information.

34. The method of claim 23, further including using the receiver to receive a wireless communication from a local area computer network.

* * * * *